United States Patent [19]

Harder, Jr.

[11] 3,747,178
[45] July 24, 1973

[54] METHOD FOR ATTACHING CUSHION TO RIGID BASE

[75] Inventor: Arthur J. Harder, Jr., Franklin Park, Ill.

[73] Assignee: Coach and Car Equipment Corporation, Elk Grove Village, Ill.

[22] Filed: Feb. 14, 1972

[21] Appl. No.: 225,921

[52] U.S. Cl. .................. 29/91.1, 297/218, 5/353.6
[51] Int. Cl. ............................................. B68g 7/00
[58] Field of Search ...................... 29/91.1; 5/353.1, 5/353.5, 353.6; 297/218

[56] References Cited
UNITED STATES PATENTS
2,833,342   5/1958   Swenson .......................... 5/353.6
1,940,636   12/1933   Stubnitz ............................ 29/91.1

Primary Examiner—Andrew R. Juhasz
Assistant Examiner—Leon Gilden
Attorney—Charles J. Merriam, Alvin D. Shulman et al.

[57] ABSTRACT

The method of manufacturing a cushioned support, such as a seat cushion having a fabric cover anchored to a rigid base member. The method includes inserting the seam portion at the peripheral edge of the fabric cover into a channel around the periphery of the rigid base member, and then inserting a thick welt inside said seam portion so that the welt can not be withdrawn from said channel.

6 Claims, 11 Drawing Figures

PATENTED JUL 24 1973 3,747,178
SHEET 1 OF 3
FIG. 1
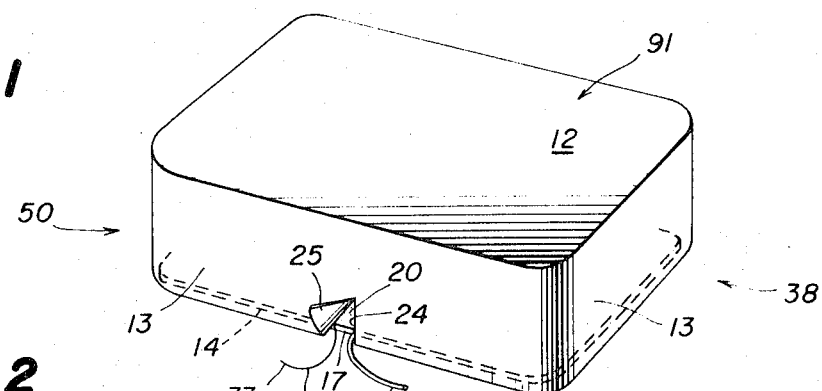
FIG. 2
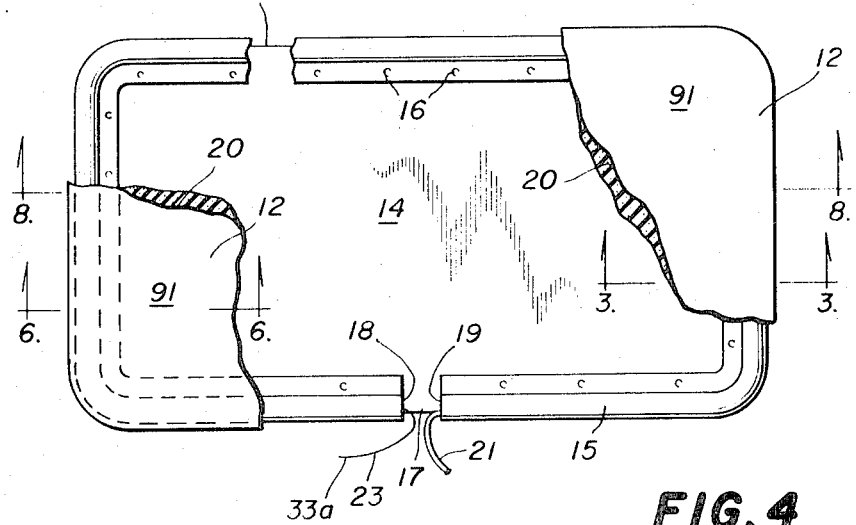
FIG. 3
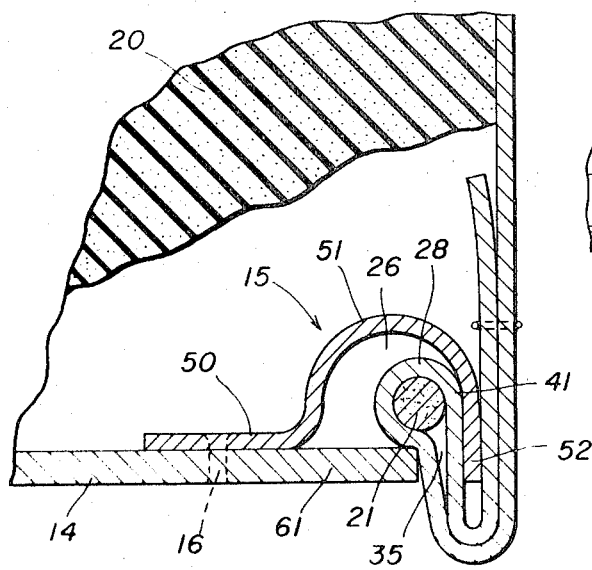
FIG. 4

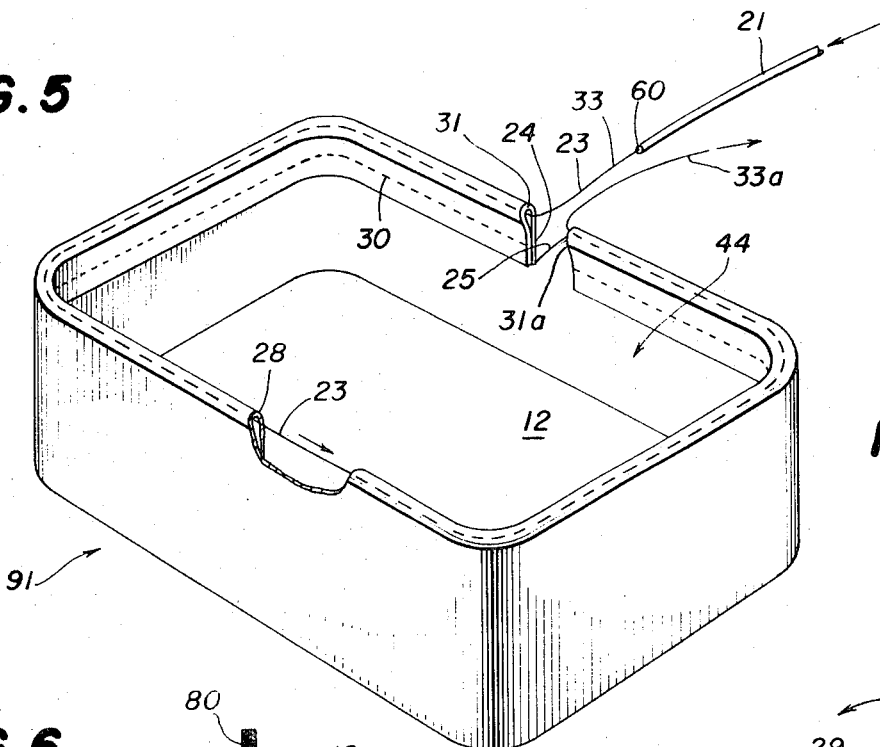
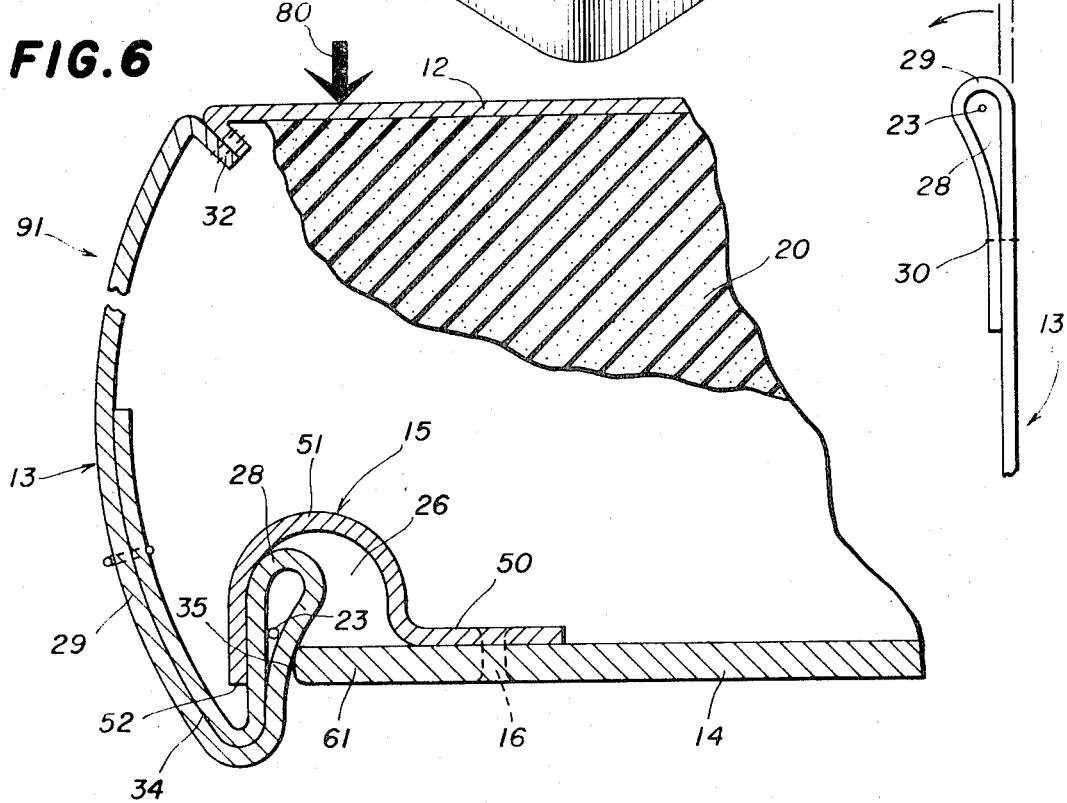

PATENTED JUL 24 1973 3,747,178

METHOD FOR ATTACHING CUSHION TO RIGID BASE

BACKGROUND OF THE INVENTION

The present invention relates generally to a simplified method of manufacturing a cushioned support such as a seat cushion or a back cushion for a vehicle seat. The method disclosed and claimed herein, although utilizing conventional materials, reduces the number of steps in the support manufacturing operation, and thus significantly diminishes both labor costs and quality control problems.

Cushioned supports for vehicle seats conventionally comprise a rigid base member supporting or mounting a resilient portion, composed of urethane foam or coil springs or the like, and a fabric cover. During manufacture, the fabric cover is stretched over the resilient portion and anchored to the rigid base member.

Because vehicle seats are subjected to a great deal of wear and abuse, their construction must be quite sturdy. In particular, there must be a very secure anchorage between the fabric cover and the rigid base member of the seat's cushioned support. Additionally, traditional building methods for cushioned supports are fairly complex, involving a number of manufacturing operations and requiring a substantial amount of time. This, in turn, has necessitated the utilization of relatively skilled labor for the manufacturing process.

SUMMARY OF THE INVENTION

The method of the present invention utilizes the same basic components now employed in conventional cushioned support manufacturing methods and produces a rugged cushioned support yet the method is relatively simple to perform. An additional feature of the method is that a misapplication of the method would be readily apparent upon even a casual inspection. Thus, hidden defects due to shoddy workmanship are greatly reduced.

The method entails positioning the resilient cushion portion between the fabric cover and the rigid base member and attaching the cover to the base member by securing a substantial portion of the periphery of the cover about the periphery of the rigid base. This is accomplished in a few simple steps: first, by fabricating a tunnel in the periphery of the fabric cover; second, by attaching a cover-retaining strip around the periphery of the rigid base member so that the strip and the periphery define a tunnel-receiving portion; third, by inserting the tunnel into the tunnel-receiving portion through a narrow mouth on the latter; and finally, by using pilot means (such as a string or mandrel) to guide a thick welt or cord into that part of the tunnel within the tunnel receiving portion, thereby preventing removal of the tunnel through the narrow mouth. The cover is thus firmly anchored to the rigid base.

Other features and advantages are inherent in the method claimed and disclosed, or will become apparent to those skilled in the art from the following detailed description in conjunction with the accompanying diagrammatic drawings.

BRIEF DESCRIPTION OF THE DRAWINGS

FIG. 1 is a perspective view of a cushioned support undergoing manufacture in accordance with an embodiment of the method of the present invention.

FIG. 2 is a plan view of the cushioned support of FIG. 1 with a substantial portion of the cushion and cover cut away.

FIG. 3 is a fragmentary sectional view taken along line 3—3 of FIG. 2.

FIG. 4 is an enlarged fragmentary sectional view of a portion of FIG. 2.

FIG. 5 is an inverted perspective view of the cover utilized in the method.

FIG. 6 is a fragmentary sectional view taken along line 6—6 of FIG. 2, illustrating an intermediate step in the method.

FIG. 7 is a diagrammatic view illustrating an early step in the method.

DETAILED DESCRIPTION OF EMBODIMENTS OF THE INVENTION

Figure 8:
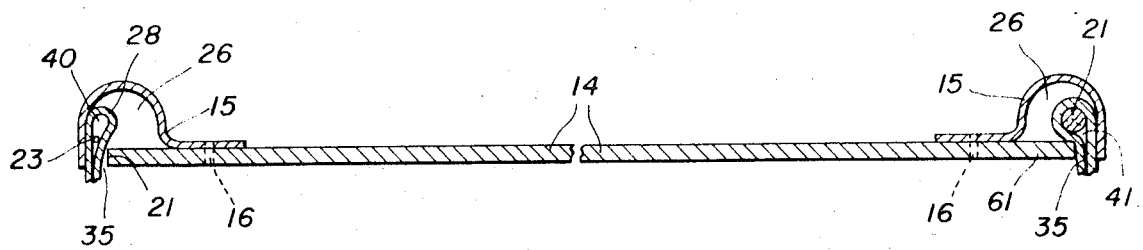
FIG. 8 is a fragmentary sectional view taken along line 8—8 of FIG 2.

FIGS. 1, 5 and 6 illustrate a cushioned support indicated generally at 50 undergoing manufacture in accordance with an embodiment of the method of the present invention. Cushioned support 50 has a box-like fabric cover 91 comprising a top part 12, a side or boxing part 13, and an open bottom 44. Top part 12 and boxing part 13 are joined by a top stitch at 32 (FIG. 6) and enclose a resilient cushion portion 20.

Referring now to FIG. 2, underlying resilient cushion portion 20 is a rigid base member 14, manufactured of metal, plastic, or the like.

Referring now to FIG. 7, early steps in the method comprise manufacturing a tunnel 28 at the periphery of boxing part 13 and, at the same time, enclosing a pilot means or string 23 therein. String 23 is placed continuously along a peripheral edge portion 29 of boxing part 13, and peripheral edge portion 29 is folded across string 23, thereby defining tunnel 28. The tunnel is secured closed by a tunnel stitch 30.

Boxing part 13 has a break at 24 (FIG. 1), thereby defining a pair of open tunnel ends 31, 31a (FIGS. 4 and 5). String 23 has string ends 33, 33a extending respectively from open tunnel ends 31, 31a (FIG. 5). String end 33 is attached to a welt 21 at 60.

Figure 9:
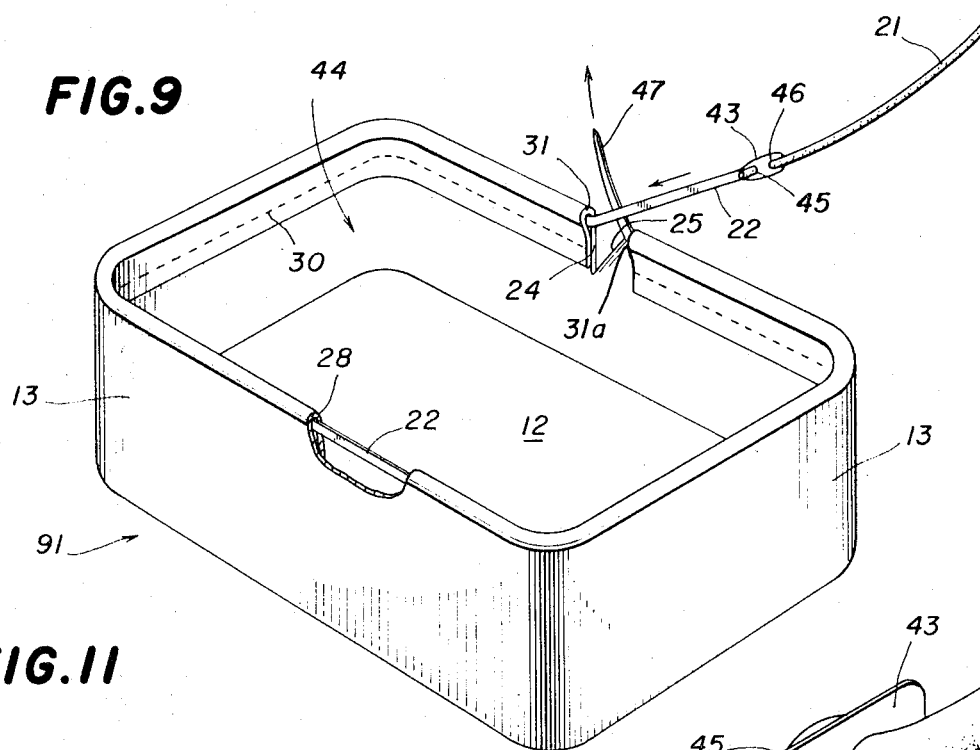
FIG. 9 is an inverted perspective view of the cover and illustrates another embodiment of the method.
Figure 10:
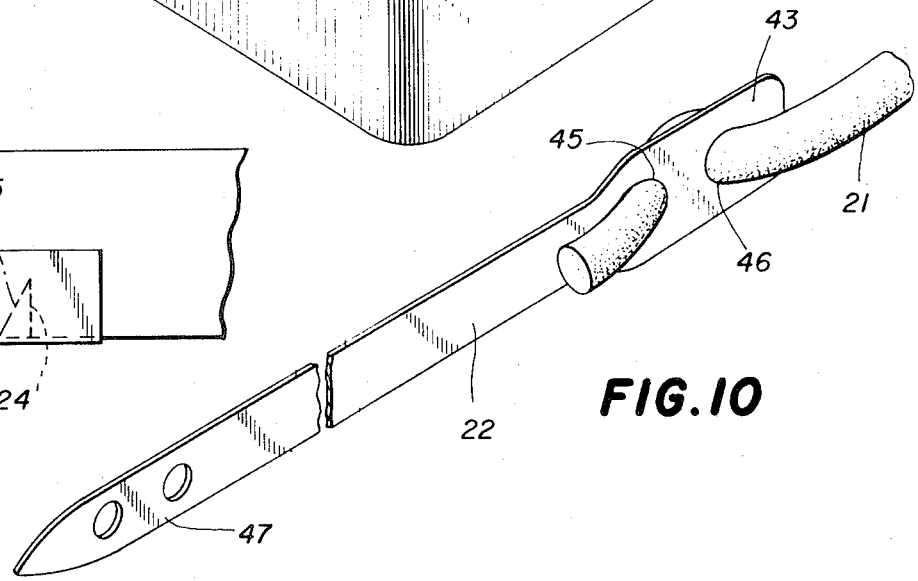
FIG. 10 is a fragmentary perspective view showing a mandrel utilized in the embodiment of FIG. 8.

FIGS. 9 and 10 illustrate an alternative preferred pilot means in the form of a flexible mandrel 22. Welt 21 is attached to a mandrel rear portion 43 at slots 45, 46. A mandrel leading end portion 47 is inserted into open tunnel end 31, and the mandrel is worked through tunnel 28 until leading end portion 47 exits through opposite open tunnel end 31a.

When the pilot means 22 or 23 is positioned as shown in FIGS. 9 and 5, fabric cover 91 is ready for attachment to rigid base member 14.

Referring to FIGS. 2–4, 6 and 8, a cover-retaining strip 15 is attached by rivets 16 (or welding) to rigid base member 14, around the latter's peripheral edge portion 61 so that strip 15 and peripheral edge portion 61 define an elongated tunnel-receiving portion 26 therebetween. The tunnel-receiving portion can also be fabricated integrally with base member 14 using a conventional die forming operation.

As shown in FIGS. 3 and 6, strip 15 has a tongue portion 50 receiving rivets 16 and integral with arcuate portion 51 integral with a depending portion 52 located outwardly of the base member's peripheral edge portion 61. Tunnel-receiving portion 26 has a continuous, elongated open mouth 35 coextensive therewith, and a pair of open, pilot-receiving tunnel ends 18, 19 defined by a discontinuation 17 therein (FIGS. 2 and 4). Open mouth 35 is wide enough to admit tunnel 28 containing string 23 or other pilot means therein (FIG. 6), but is narrow enough to retain tunnel 28 when welt 21 is contained therein (FIG. 3).

Referring now to FIGS. 1-2, 4-5 and 9, in assembling cushioned support 50, resilient cushion portion 20 is first introduced into fabric cover 91, through open cover bottom 44; and the two are then placed on rigid base member 14 so that resilient cushion portion 20 is located between rigid base member 14 and top part 12 of fabric cover 91 and so that break 24 of the cover's boxing part 13 is aligned with discontinuation 17 of tunnel-receiving portion 26.

Referring now to FIG. 6, the next step in the method is to insert tunnel 28, having string 23 or mandrel 22 therein, into tunnel-receiving portion 26. When mandrel 22 is located along the entirety of tunnel 28, as shown in FIG. 9, the mandrel rigidifies the tunnel and facilitates insertion of the tunnel into tunnel-receiving portion 26. During the tunnel-inserting operation a downward force 80 is exerted on top part 12 of cover 91, e.g., by manually pushing down on the cover. This compresses cushion 20 between rigid base member 14 and top part 12, thereby depressing peripheral edge portion 29 of boxing part 13 with respect to rigid base member 14. A slack 34 in boxing part 13 facilitates the tunnel-insertion step. Pilot-containing tunnel 28 is introduced into tunnel-receiving portion 26 through open mouth 35. This procedure is repeated all around the periphery of rigid base member 14 until substantially all of the pilot-containing tunnel is inside tunnel-receiving portion 26 with opposite ends of string 23 protruding both from respective tunnel ends 31, 31a and from opposite ends 18, 19 of the tunnel-receiving portion.

FIGS. 1, 2, 4, 5, & 9 illustrate the welt-introducing step comprising pulling on string end 33a (or mandrel portion 47) to draw the other string end 33 (or mandrel portion 45) and the attached welt 21 through tunnel 28 and tunnel-receiving portion 26.

String 23 is pulled until only opposite ends of welt 21 protrude from respective open tunnel ends 31, 31a, thereby substituting welt 21 for string 23. String 23 is then disconnected from welt 21, opposite ends of welt 21 are tied or secured, and cover flap 25 brought across break 24 and stitched or otherwise attached to boxing part 13 (FIG. 1). Force 80 (FIG. 6) is then removed from top part 12 of cover 91.

As illustrated in FIG. 3, replacement of string 23 with larger-diameter welt 21 serves to hold the welt-containing portion 41 of tunnel 28 within tunnel-receiving portion 26 because the combined diameter of welt 21 and welt-containing portion 41 is too great to exit through the mouth 35 of tunnel-receiving portion 26.

Figure 11:
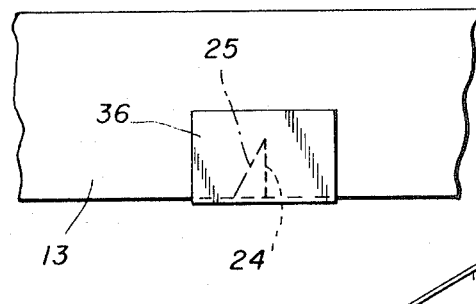
FIG. 11 is a fragmentary elevational view showing a portion of an assembled cushioned support manufactured in accordance with an embodiment of the method of the present invention.

Referring now to FIG. 11, a trim plate 36 is secured across break 24 and cover flap 25, by conventional fastening means (not shown). The manufacturing operation is now complete.

The foregoing detailed description has been given for clearness of understanding only, and no unnecessary limitations should be understood therefrom as modification will be obvious to those skilled in the art.

What is claimed is:

1. The method of manufacturing a cushioned support having a rigid base member, a resilient cushion portion and an open, box-like cover having a peripheral edge portion, said method comprising the steps of:
    fabricating a tunnel around said peripheral edge portion of said cover with said tunnel having a pair of open ends;
    providing elongated, flexible pilot means having a pair of opposite ends;
    attaching a welt to one end of said pilot means;
    positioning said pilot means in said tunnel with at least the other end of said pilot means extending through an open end of said tunnel;
    fabricating rigid cover-retaining means around the periphery of said rigid base member so that said retaining means and said periphery define an elongated, tunnel-receiving portion having a discontinuation therein and an open mouth extending around said periphery;
    performing said fabricating step so that said mouth of said tunnel-receiving portion is large enough to receive said tunnel with said pilot means therein and small enough to prevent removal of said tunnel with said welt therein;
    aligning said open ends of said tunnel with said discontinuation in said tunnel-receiving portion;
    introducing substantially all of said tunnel, with said flexible pilot means therein, into said tunnel-receiving portion, through the mouth thereof, continuously around the periphery of said rigid base, and positioning at least said other end of said pilot means at said discontinuation;
    drawing said one end of said pilot means through said tunnel by pulling on the other end until the opposite ends of said welt each project from a respective one of said open ends of said tunnel and of said tunnel-receiving portion at said discontinuation;
    disengaging said pilot means from said welt;
    and securing said welt to prevent its withdrawal from said tunnel through said open ends thereof.

2. The method of manufacturing a cushioned support according to claim 1 wherein said step of fabricating the retaining means comprises:
    providing a rigid cover-retaining strip having an arcuate cross-section for mounting around the periphery of said rigid base member;
    and, attaching said cover-retaining strip to said periphery of said base member so that said attached strip and said periphery define an elongated, tunnel-receiving portion having an open mouth extending around said periphery with a discontinuation defined by opposite ends of said strip.

3. The method of manufacturing a cushioned support according to claim 1 wherein said tunnel fabricating step comprises:
    folding said peripheral edge portion, around the entire periphery of the cover, to define a tunnel;
    and securing said tunnel closed by attaching the folded edge portion to the cover.

4. The method of manufacturing a cushioned support according to claim 3 and further including:
   positioning said pilot means around substantially all of said peripheral edge portion of the cover;
   and performing said folding step so that said end portion is brought across said pilot means whereby said pilot means is enclosed within said tunnel after said attaching step.

5. The method of manufacturing a cushioned support according to claim 1 and further including the step of: providing welt-securing means on said pilot means for attaching said welt to said pilot means.

6. The method of manufacturing a cushioned support according to claim 1 wherein said step of providing pilot means comprises:
   providing pilot means which rigidifies said tunnel when positioned therein to facilitate insertion of the tunnel into said tunnel-receiving portion during said introducing step.

* * * * *